US012685323B2

(12) United States Patent
Rosa et al.

(10) Patent No.: US 12,685,323 B2
(45) Date of Patent: Jul. 21, 2026

(54) APPARATUS FOR MAKING CONFECTIONERY PRODUCTS

(71) Applicant: Perfetti Van Melle S.P.A., Lainate (IT)

(72) Inventors: Massimo Rosa, Lainate (IT); Alessandro Franco, Lainate (IT); Massimiliano Moneta, Lainate (IT); Andrea Formicola, Lainate (IT); Evsen Suleymanoglu, Milan (IT); Alessio Tulli, Origgio (IT); Keiji Fujimoto, Lainate (IT); Maurizio Deleo, Lainate (IT)

(73) Assignee: Perfetti Van Melle S.P.A., Lainate (IT)

( * ) Notice: Subject to any disclaimer, the term of this patent is extended or adjusted under 35 U.S.C. 154(b) by 320 days.

(21) Appl. No.: 18/470,444

(22) Filed: Sep. 20, 2023

(65) Prior Publication Data

US 2024/0090527 A1    Mar. 21, 2024

(30) Foreign Application Priority Data

Sep. 21, 2022    (IT) ........................ 102022000019308

(51) Int. Cl.
A23G 4/04      (2006.01)
B26D 3/08      (2006.01)
(52) U.S. Cl.
CPC .............. *A23G 4/04* (2013.01); *B26D 3/085* (2013.01); *B26D 2210/02* (2013.01)
(58) Field of Classification Search
CPC ....... A23G 4/04; B26D 3/085; B26D 2210/02
See application file for complete search history.

(56) References Cited

U.S. PATENT DOCUMENTS

| | | | | |
|---|---|---|---|---|
| 1,577,620 A | * | 3/1926 | Gammeter | B29D 30/46 |
| | | | | 83/342 |
| 1,653,129 A | * | 12/1927 | Taylor | B26D 1/385 |
| | | | | 83/342 |
| 1,693,589 A | * | 12/1928 | Bolton | B29D 30/46 |
| | | | | 33/36 |
| 1,771,981 A | * | 7/1930 | Mustin | A23G 4/046 |
| | | | | 426/103 |

(Continued)

FOREIGN PATENT DOCUMENTS

| BE | 642030 A | 4/1964 |
|---|---|---|
| CN | 206840698 U | 1/2018 |

(Continued)

OTHER PUBLICATIONS

Search report of priority application No. IT202200019308 issued May 4, 2023.

*Primary Examiner* — Sean M Michalski
(74) *Attorney, Agent, or Firm* — Silvia Salvadori, P.C.; Silvia Salvadori

(57)    ABSTRACT

A description is given of apparatus for making confectionery products (1), in particular chewing gum, comprising a cutting station comprising at least two cutting units (10, 20) arranged in succession along the production line and each comprising at least one respective pair of opposing rollers (11a, 11c) and (21a, 21c) provided with knives (30), (40) oriented obliquely with respect to the flow of feeding of a sheet of confectionery material, preferably a rubbery material, in such a way that the opposing rollers of each pair are mirrored one to the other, and with respect to the corresponding rollers of the other pair.

10 Claims, 3 Drawing Sheets

(56)  References Cited

U.S. PATENT DOCUMENTS

| | | | | |
|---|---|---|---|---|
| 3,570,417 | A * | 3/1971 | Herrmann | A23G 3/0236 |
| | | | | 426/104 |
| 5,667,824 | A * | 9/1997 | Ream | B29C 43/46 |
| | | | | 426/660 |
| 5,971,739 | A * | 10/1999 | Hoffman | A23G 4/04 |
| | | | | 425/327 |
| 6,389,941 | B1 * | 5/2002 | Michler | F16F 15/02 |
| | | | | 83/575 |
| 6,623,266 | B2 * | 9/2003 | Jani | A23G 4/20 |
| | | | | 425/126.2 |
| 2002/0184985 | A1 * | 12/2002 | Ishibuchi | B26D 7/2628 |
| | | | | 83/342 |
| 2003/0172785 | A1 * | 9/2003 | Formon | B26F 1/20 |
| | | | | 83/72 |
| 2006/0040041 | A1 * | 2/2006 | Shulski | A23G 3/0025 |
| | | | | 426/660 |
| 2007/0104828 | A1 * | 5/2007 | Fornaguera | B30B 11/12 |
| | | | | 426/3 |
| 2013/0202734 | A1 * | 8/2013 | Jani | A23G 4/04 |
| | | | | 426/5 |
| 2016/0087279 | A1 * | 3/2016 | Tomono | H01M 4/70 |
| | | | | 429/233 |
| 2016/0309737 | A1 * | 10/2016 | Wymore | B26D 7/1854 |

FOREIGN PATENT DOCUMENTS

| | | | | |
|---|---|---|---|---|
| EP | 1894476 | A2 | 3/2008 | |
| GB | 2201883 | A | 9/1988 | |
| WO | WO-0154872 | A1 * | 8/2001 | B26F 1/20 |
| WO | WO-2015085159 | A1 * | 6/2015 | A23G 7/0018 |

* cited by examiner

1 -  Longitudinal knife          2 -  Transverse knife          Overall cut on rubbery strip 1-  First knife inclined          2-  Second knife inclined          Overall cut on rubbery strip Direction of flow of the rubbery strip in the line

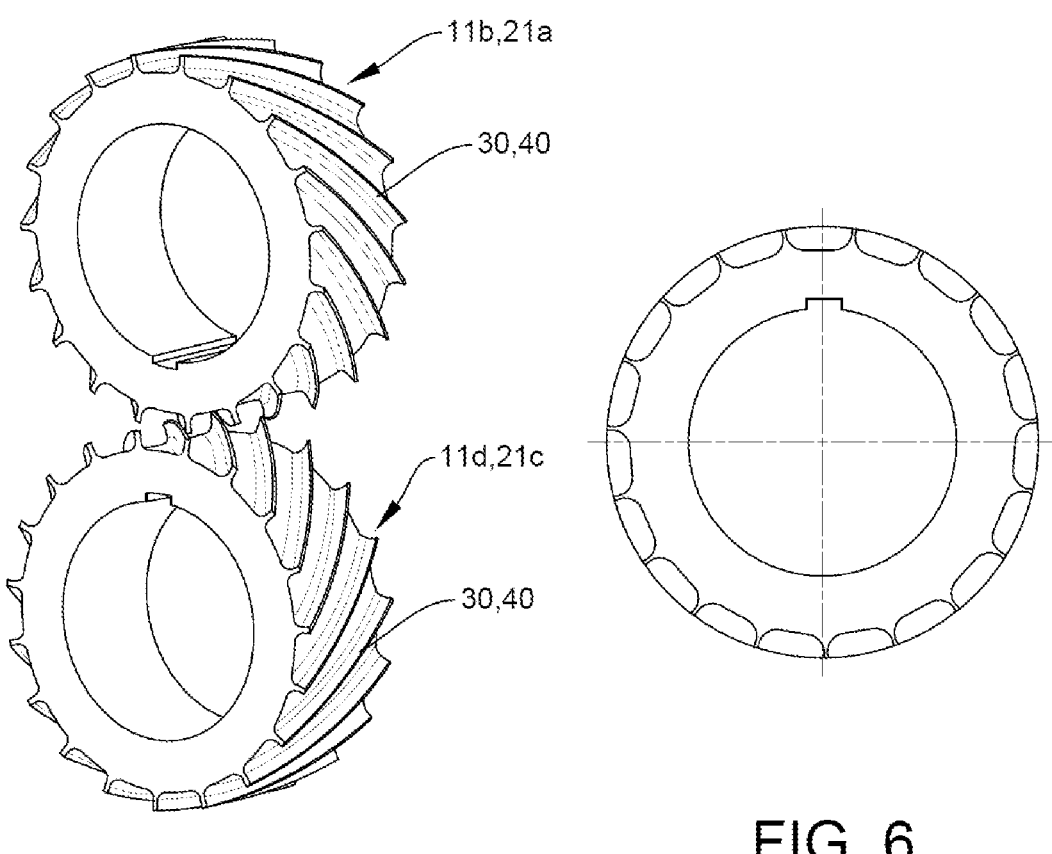
FIG. 5
FIG. 6
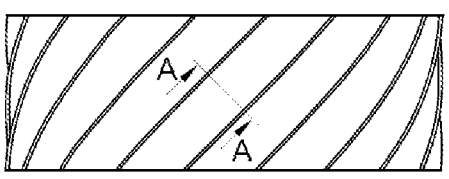
FIG. 7
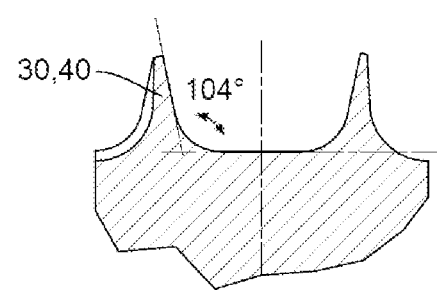
FIG. 8

APPARATUS FOR MAKING CONFECTIONERY PRODUCTS

This US Non-Provisional application claims priority to and the benefit of Italian Patent Application No. 102022000019308 filed 21 Sep. 2022, the content of which is incorporated herein by reference in its entirety.

The invention relates to an apparatus for making a confectionery product consisting of a chewing gum having polyhedral shape.

STATE OF THE ART

Production lines for the production of chewing gum are known which provide for the formation of the same through the use of a technique known as "rolling and scoring" which consists in the use of a layer of rubbery material from which a series of single pieces are obtained following the passage of the aforesaid layer through a cutting station, as described for example in WO2015085159.

The cited document refers how, using such a production system according to the prior art, given the strong adhesiveness of the rubbery material, it is necessary to use considerable quantities of powder material (e.g. talc) to guarantee the detachment of the material from the cutting station and allow therefore the forming of the single pieces with a continuous flow, avoiding that the same remain adhered to the knives.

The use of such powder causes technical inefficiencies due to the need for continuous maintenance work on the line to ensure proper functioning thereof.

WO2015085159 proposes as alternative solutions those of proceeding to oil the knives present in the cutting station, usually in the form of rollers, or of obtaining the detachment of the single pieces from the knives by means of a continuous flow of compressed air.

The processes and systems described by the patents cited with reference to chewing gum can also be applied to other confectionery material, such as fondant, chewable or hard candy. The problems described in detail with reference to chewing gum can also be found in these materials. In fact, the use of release agents also in the processing of these confectionery products is known to persons skilled in the art. By way of example, oils, fats or powders such as talc or starch are used.

There remains the need to find further production solutions other than those listed above that allow considerable savings to be made in materials and energy applied to the production process, obtaining in any case the release of the single pieces and thus preserving the possibility of continuous production.

Moreover, particularly in the case of production of single pieces of regular or irregular polyhedral shape, for example cubic or rhomboidal, it is known that due to the relaxation of chewing gum, or of other confectionery material, after forming, the single pieces thus obtained tend to be subject to a deformation phenomenon and, in particular, expansions are produced which tend, in the long run, to make cubes and prisms take on a rounded/ovoid shape.

WO2009138208 and U.S. Pat. No. 8,124,145 describe the making of single pieces in cubic form by citing the use of various production techniques, including the above-mentioned rolling & scoring, but they do not deal in any way either with the problem of detaching the single pieces from the knives or the problem of deformation/expansion of the single pieces once formed.

DETAILED DESCRIPTION OF THE INVENTION

The Applicant, always in search of innovations aimed at offering the consumer quality products as well as aesthetically pleasing products, has further researched the possibility of using production systems similar to those known to produce confectionery products and in particular chewing gum without the use of large quantities of material adjuvant to the production process such as the described powders and oils and without the application of further energies/forces to the process, such as the aforementioned continuous flow of compressed air. Furthermore, the Applicant has sought to obtain the abovementioned result by also solving the problem of the deformation and expansion of the single pieces, thus eliminating the undesirable unsightliness of the product that is a concern to the consumer.

The above has been achieved by the invention with the features listed in the appended independent claim 1.

Preferred embodiments of the invention are disclosed in the dependent claims.

The apparatus for making confectionery products, such as fondants, hard candy, chewable candy and in particular chewing gum, according to the invention, comprises a cutting station comprising at least two cutting units arranged in succession along the production line and each comprising at least one respective pair of opposing rollers provided with knives oriented obliquely with respect to the flow of feeding of a sheet of confectionery material, in particular of rubbery material, in such a way that the opposing rollers of each pair are mirrored one with respect to the other, and with respect to the corresponding rollers of the other pair.

Each cutting unit comprises at least one adjacent pair of counter-rotating rollers provided with oblique knives in such a way as to be specular one to the other and with respect to the corresponding rollers of the adjacent pair.

BRIEF DESCRIPTION OF THE DRAWINGS

The features of the invention will be made clear by the following description of an example embodiment thereof illustrated in the accompanying drawings, wherein:

FIG. 5 is an axonometric view schematically showing two opposing rollers of the abovementioned cutting units, in particular those of the right side of FIG. 3 and those of the left side of FIG. 4;

FIG. 6 is a lateral profile view of one of the rollers of FIG. 5, for example the upper one;

FIG. 7 is a view from above of one of the rollers of FIG. 5;

FIG. 8 is an enlarged section taken along plane A-A of FIG. 7;

DESCRIPTION OF A PREFERRED EMBODIMENT

Figure 1:
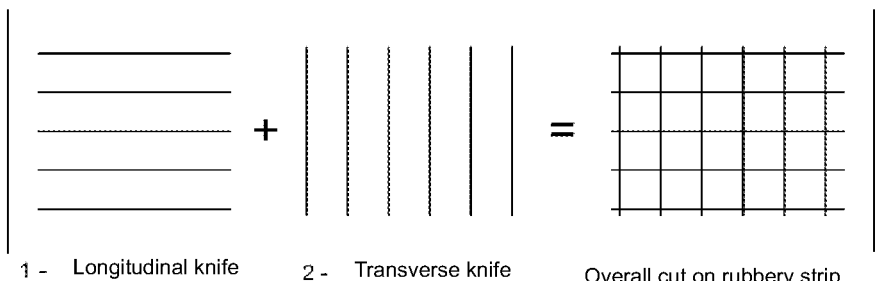
FIG. 1 is a diagrammatic view of a cutting station used in a production process of confectionery products according to the prior art.

As shown in the diagram of FIG. 1, normally, the cutting station used in a rolling & scoring production process of confectionery products according to the prior art consists of at least two rollers, placed in succession along the production line, which respectively perform a longitudinal cut and a transverse or perpendicular cut with respect to the direction of flow of feeding of the confectionery material, preferably a rubbery material, in the cutting station, obtaining products of rectangular or square shape, which exit the cutting station with one side facing frontally. The diagram in FIG. 1 can be applied to all types of confectionery material, with fondant, hard candy, chewy candy or rubbery material being particularly preferred.

This cutting technique, as mentioned previously, has the disadvantage of the single pieces remaining attached to the knives in the case of making shapes with knife angles around ninety degrees with respect to the surface of the roller. Indeed, in this case, following the action of the knives, a vacuum effect is created that does not allow the single piece to detach from the knife. To overcome this disadvantage it is necessary to make a roller whose knives form an angle with the surface of the body of the roller of at least 140°.

However, the angle in question means that the expanding effect of the single pieces is further accentuated.

Figure 2:
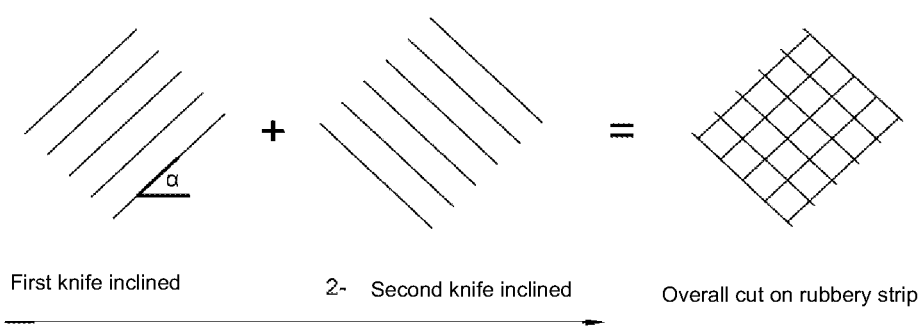
FIG. 2 is a diagrammatic view of a cutting station according to the present invention.

In order to overcome the aforementioned disadvantages, the Applicant has developed a cutting station, as shown in the diagram of FIG. 2, which consists of at least two consecutive rollers having knives oriented at an angle with respect to feeding of the confectionery material, in particular rubbery material, in the cutting station and opposite one to the other in terms of orientation. In this way rectangular, square or rhomboid-shaped products are obtained which exit the cutting station with a vertex facing frontally.

This result can be achieved with just two rollers, or better two pairs of opposing rollers, placed in succession one after the other, along the production line, with the knives having the above orientations. However, due to the pressure exerted perpendicularly with respect to the flow of the confectionery material and in particular of the rubbery material, there could be a lateral slipping of the material, which would require the application of other precautions in order to avoid such slipping and possible consequent phenomena of interruption of the continuous cycle processing.

Figures 10, 11:
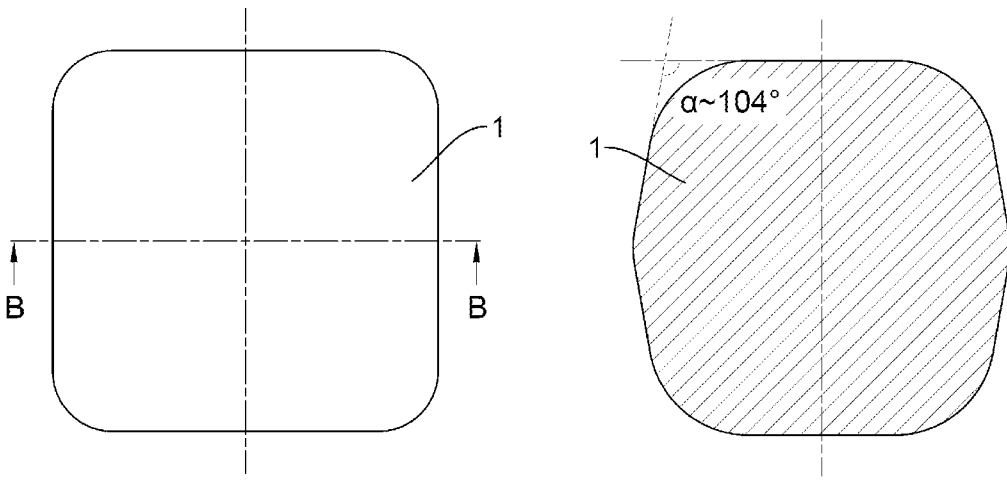
FIG. 10 is an enlarged plan view of a single confectionery product obtained with the apparatus according to the invention.
FIG. 11 is a section taken along plane B-B of FIG. 10.

In order to avoid this, a preferred embodiment of the invention shown in FIGS. 3 to 8 is now described, for obtaining single pieces of edible products, in particular chewing gum, shown schematically in the plan and cross-sectional views of FIGS. 10 and 11, where they are denoted by reference numeral 1.

After extrusion, the confectionery material is first passed through several pairs of opposing and counter-rotating rollers in order to reduce the thickness thereof to bring it to the height of the product that is to be obtained, and finally reaches the cutting station according to the present invention, shown schematically in FIGS. 3 and 4, from which a sheet of material 2 (FIG. 9) bearing the single products 1 exits, which will subsequently be separated one from the other following cooling of the mass of material.

Figures 3, 4:
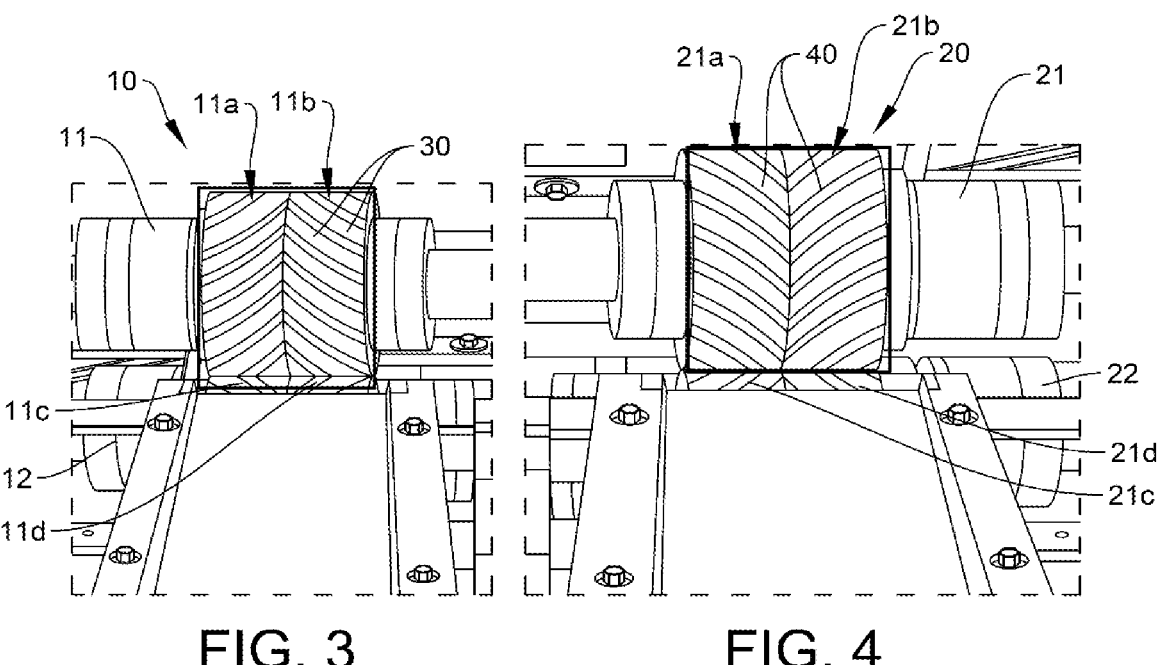
FIG. 3 shows a front view of a first cutting unit of the cutting station according to the invention.
FIG. 4 shows a second cutting unit placed downstream or upstream of the first cutting unit.

The cutting station comprises two cutting units, denoted respectively by reference numerals 10 and 20 in FIGS. 3 and 4, arranged indifferently in succession, one after the other, to one another along the production line.

The cutting unit 10 comprises two adjacent rollers 11a, 11b, mounted on a shaft 11 perpendicular to the direction of flow of the material, in such a way as to be specular, in the sense that the oblique knives (i.e. inclined with respect to the axis of the shaft 11, or with respect to the direction of feeding of the material) 30 with which they are provided are opposite one to the other or specular. The pair of adjacent rollers 11a, 11b are conveniently opposed to a corresponding specular pair of adjacent rollers 11c, 11d (not clearly visible in FIG. 3) mounted on a shaft 12 placed parallel and below the shaft 11. The arrangement of the rollers causes the knives 30 of the horizontally arranged adjacent pairs of rollers 11a, 11b and 11c, 11d and vertically arranged opposed pairs of rollers 11a, 11c and 11b, 11d to be specular to each other, i.e. they have opposing orientation, while the knives of the alternating, i.e. diagonally arranged, rollers on the shafts 11, 12, i.e. of the alternating pairs of rollers 11a, 11d and 11b, 11c have the same orientation.

In practice, rollers 11a, 11b, 11c, 11d are structurally identical one to the other, the orientation of the knives 30, the same or mirrored, being determined by the way in which these rollers are mounted on the respective shafts.

The second cutting unit 20, which comprises rollers 21a, 21b and 21c, 21d mounted on respective shafts 21 and 22, has exactly the same features as the first cutting unit 10, with respect to which it is specular, i.e. the orientation of the knives 40 of its rollers is reversed with respect to the orientation of the corresponding rollers of the cutting unit 10.

FIG. 5 is an axonometric view of a pair of opposing and counter-rotating rollers, for example 11b, 11d of the cutting unit 10 of FIG. 3 or 21a, 21c of the cutting unit 20 of FIG. 4, showing the orientation and coupling of the oblique knives, i.e. inclined as mentioned previously, 30 or 40 that perform the cutting of the material.

In a particularly preferred embodiment of the invention, the knives 30, 40 are oriented at 45° with respect to the axes of the respective rollers, so as to perform a 45° cut (angle α FIG. 2) of the confectionery material and in particular of the rubbery material with respect to the direction of feeding of said sheet of confectionery material.

Figure 9:
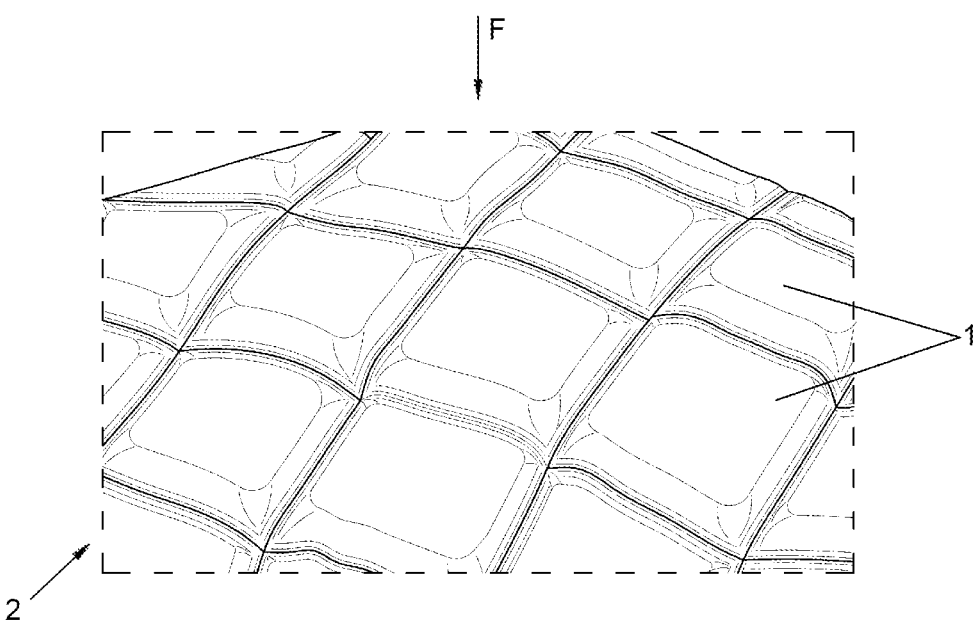
FIG. 9 is a drawing taken from a photo showing the sheet of material exiting the cutting station.

The oblique orientation of the knives makes it possible to obtain the exit of the single piece from the cutting station edgewise, or vertex-wise, and not sidewise, as shown by arrow F in FIG. 9, thus facilitating the detachment of the single piece from the knives. In fact, in the case of a transverse knife according to the prior art, when it is detached from the edible material the entire front face of a confectionary product is detached at the same time, on the other hand, when an angled knife is detached from the confectionary product as in the present invention, the corner is detached and, considering that the corner has a smaller area than the front face, less force is required to detach it.

The edgewise exit of the single pieces, already in itself facilitating detachment from the knives, thus makes it possible to reduce the angle at the base formed by the latter with the surface of the body of the roller from the 140° of the conventional art down to 104° (see FIG. 8) without creating a vacuum effect which hinders the detachment of the single piece from the knives and bringing the benefit of reducing if not eliminating the expansion of the single pieces following their forming.

This effect can be seen in the cross section of a confectionery product 1 in FIG. 11, where the angle formed by two adjacent sides of the confectionery product, substantially corresponding to the angle at the base formed by each knife with the surface of the respective roller, is approximately 104°.

In a particular embodiment of the present invention, the nominal distance between the surfaces of two opposing rollers is equal to the distance between the crests of adjacent knives measured orthogonally to the crests, in which case the pieces produced by the present invention are similar to cubes (FIG. 10 and FIG. 11).

For example: with a nominal distance between the surfaces of two opposing rollers of 13.7 mm and approximately a similar distance between the crests of adjacent knives, the single pieces obtained would have nominal dimensions in height, width and depth of 13.7 mm and a nominal weight of 2.38 g (density 1.2 g/cm3, volume 1.987 cm³).

Naturally, the invention is not limited to the particular embodiment described previously and illustrated in the accompanying drawings, but numerous detailed changes may be made thereto within the reach of the person skilled in the art without departing from the scope of the invention as defined by the claims appended to the present description.

The invention claimed is:

1. Apparatus designed for making confectionery products (1), comprising a unit of extrusion of a confectionery material, suitable for forming a sheet of confectionery material, at least one pair of opposing and counter-rotating rollers, suitable for reducing the thickness of said sheet of material and a cutting station comprising opposing and counter-rotating rollers, provided with knives for defining the shape of the products (1), wherein said cutting station comprises at least two cutting units (10, 20) arranged one after the other along the production line and each comprising at least one respective pair of opposing rollers (11a, 11c) and (21a, 21c) provided with knives (30), (40) oriented at an angle with respect to the direction of feeding of said sheet of confectionery material, so that the opposing rollers of each pair are mirrored with respect to each other, and with respect to the corresponding rollers of the other pair.

2. Apparatus according to claim 1, wherein each cutting unit (10, 20) comprises at least one other adjacent pair of counter-rotating rollers (11b, 11d) and (21b, 21d) having knives oriented at an angle with respect to the direction of feeding of said sheet of confectionery material, so as to be specular with respect to each other and with respect to the corresponding rollers of the adjacent pair.

3. Apparatus according to claim 1, wherein the knives (30, 40) are oriented at 45° with respect to the axes of the respective rollers, so as to perform a 45° cut of the rubbery confectionery material with respect to the direction of feeding of said sheet of confectionery material.

4. Apparatus according to claim 1 in which the angle at the base formed by the knives (30, 40) with the surface of the corresponding roller measures from 130° to 104°.

5. Apparatus according to claim 1, wherein said confectionery material is chewing gum.

6. Cutting station of an apparatus for making confectionery products (1), formed on a sheet of confectionery material comprising at least two cutting units (10, 20) arranged in one after the other and each comprising at least one respective pair of opposing rollers (11a, 11c) and (21a, 21c) provided with knives (30), (40) oriented at an angle with respect to the direction of feeding of said sheet of confectionery material, so that the rollers of each pair are mirrored to each other and with respect to the corresponding rollers of the other pair, as set forth in claim 1.

7. Cutting station according to claim 6, wherein said confectionery material is chewing gum.

8. Method for the production of edible products (1), consisting of passing a confectionery material through several pairs of opposing and counter-rotating rollers suitable for reducing its thickness, wherein said confectionery material of reduced thickness is passed through a cutting station of an apparatus according to claim 1, for forming individual pieces (1) of chewing gum.

9. An edible product (1) selected from fondant, chewable candy, hard candy and chewing gum made with the apparatus according to claim 1 and a method consisting of passing a confectionery material through several pairs of opposing and counter-rotating rollers suitable for reducing its thickness, wherein said confectionery material of reduced thickness is passed through a cutting station of said apparatus for forming individual pieces (1) of chewing gum, wherein the angle formed by the upper and lower walls of this edible product (1) with the lateral walls varies from 130° to 104°.

10. The edible product of claim 9, wherein said edible product is a confectionery product.

* * * * *